US006931061B2

(12) United States Patent
Youn et al.

(10) Patent No.: US 6,931,061 B2
(45) Date of Patent: Aug. 16, 2005

(54) METHOD OF REAL TIME MPEG-4 TEXTURE DECODING FOR A MULTIPROCESSOR ENVIRONMENT

(75) Inventors: Jeongnam Youn, San Jose, CA (US); Takao Yamazaki, Cupertino, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 194 days.

(21) Appl. No.: 10/294,925

(22) Filed: Nov. 13, 2002

(65) Prior Publication Data

US 2004/0091052 A1 May 13, 2004

(51) Int. Cl.[7] .............................................. H04N 1/66
(52) U.S. Cl. .............................................. 375/240.03
(58) Field of Search ..................... 375/240.18, 240.03, 375/240.02, 240.09, 240.11, 240.12, 240.24; 348/600.1; 382/250, 268, 232; H04B 1/66

(56) References Cited

U.S. PATENT DOCUMENTS

| | | | | |
|---|---|---|---|---|
| 5,001,559 A | * | 3/1991 | Gonzales et al. | ........ 348/400.1 |
| 5,737,451 A | * | 4/1998 | Gandhi et al. | ............. 382/268 |
| 5,959,674 A | * | 9/1999 | Jang et al. | ................ 375/240.2 |
| 6,173,080 B1 | * | 1/2001 | Cho et al. | .................... 382/250 |
| 6,385,242 B1 | * | 5/2002 | Chen | ..................... 375/270.03 |
| 6,647,061 B1 | * | 11/2003 | Panusopone et al. | .. 375/240.12 |
| 6,690,836 B2 | * | 2/2004 | Natarajan et al. | ........... 382/250 |
| 2003/0152149 A1 | * | 8/2003 | Denolf | ................... 375/240.24 |
| 2003/0156648 A1 | * | 8/2003 | Holcomb et al. | ...... 375/240.18 |

* cited by examiner

*Primary Examiner*—Tung Vo
(74) *Attorney, Agent, or Firm*—John P. O'Banion (57) ABSTRACT

An apparatus and method is described for performing texture-decoding within a video decoder processing a series of macroblocks within a video bit-stream. The inventive texture decoding is particularly well suited for implementation within decoders incorporating multiple processors. The method separates data independent operations from data dependent (sequential) operations wherein multiprocessing may be efficiently utilized for processing data independent macroblocks. The method preferably makes an assumption as to prediction direction within the set of data dependent operations. A prediction determination is then made and the assumption corrected if necessary with a transposition within the data independent operations operating on the macroblocks. The method reduces the computational overhead and provides for efficiently segmenting operations within a multiprocessing decoder.

45 Claims, 11 Drawing Sheets

METHOD OF REAL TIME MPEG-4 TEXTURE DECODING FOR A MULTIPROCESSOR ENVIRONMENT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the public files or records of the United States Patent and Trademark Office, but otherwise reserves all copyright rights whatsoever. The copyright owner does not hereby waive any of its rights to have this patent document maintained in secrecy, including without limitation its rights pursuant to 37C.F.R. §01.14.

BACKGROUND OF THE INVENTION

1. Field of the Invention

This invention pertains generally to video decoding, and more particularly to a method of performing decoding operations that are particularly well-suited for use in multiprocessor environments.

2. Description of the Background Art

A number of formats are currently available within which video may be encoded. One such format is the MPEG-4 video coding standard which has been established to support object-oriented coding mechanisms. MPEG-4 is generally considered a highly promising video coding standard for a number of video applications. The promise of MPEG-4 is at least partially the result of the numerous tools which are currently being made available for MPEG-4 coding. In addition to providing an object-oriented coding scheme, a high coding efficiency can be achieved utilizing MPEG-4 with respect to encoded bit-rate and video quality. The efficiency of MPEG-4 is primarily the result of incorporating advanced coding schemes which have been lacking within other video coding standards, such as MPEG-1 and MPEG-2. It should, however, be recognized that the use of these advanced encoding techniques complicates the decoding process within MPEG-4, and formats of a similar architecture, thereby complicating the implementation of decoders which operate on these video bit-streams in real time.

Recently, industry resources have been increasingly directed at designing fast decoders, such as for MPEG-4, which may be utilized to provide real-time decoding within a number of applications. These efforts, however, have been largely directed at decoders which integrate a single fast processing element, or a pair of fast processing elements, and have not addressed solving the problem in response to the use of decoders which integrate an arbitrary number of lower cost processors.

Coefficients utilized within the MPEG-4 format are encoded utilizing DC and AC predictions which often reference information from previously encoded macroblocks. It will be appreciated therefore that decoding of these macroblocks requires accessing information about other, temporally displaced, macroblocks. Motion vectors are also predicted from the motion vectors of adjacent macroblocks in similar ways. Due to such predictions, the decoding of a macroblock requires access to the information from previously decoded macroblocks. This requirement implies that the decoding of macroblocks within the incoming bit-stream must be performed sequentially from the first macroblock to the last macroblock which is directed at the video object plane (VOP). Conventional decoders are generally constrained to this sequential macroblock processing paradigm.

Figure 1:
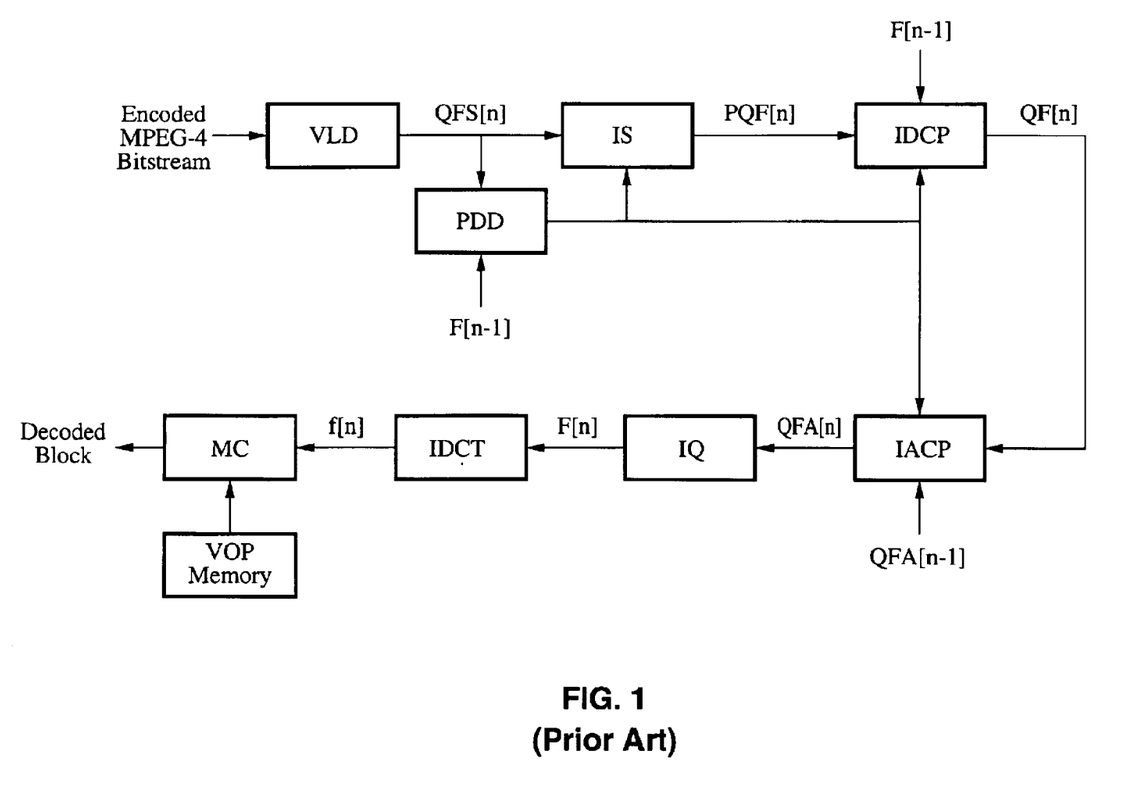
FIG. 1 is a block diagram of a conventional decoder performing texture processing operations on an encoded bit-stream.

FIG. 1 illustrates an example of a decoder implemented for an MPEG-4 bit-stream in which decoding operations are performed on a block-by-block basis. Header and data information is first decoded through variable length decoding (VLD) from within the encoded MPEG-4 bit-stream, and then a prediction direction is determined (PDD) for use by subsequent operations. The data is then typically subject to inverse scanning (IS), inverse DC prediction (IDCP), inverse AC prediction (IACP), inverse quantization (IQ), inverse discrete-transform (IDCT), and finally, motion compensation in association with the video object plane (VOP). As a result of the dependence on prediction direction, it would be difficult to separate the decoding operations for execution on multiple processors to expedite the decoding process.

It will be appreciated that during decoding, the inverse-scanning (IS) process converts the decoded one-dimensional array into a two-dimensional array for further processing. The syntax of the MPEG-4 bit-stream provides at least three different inverse-scanning methods, specifically: zigzag__scan, alternate__horizontal__scan, and alternate__vertical__scan. The bit-stream itself does not include information as to which inverse-scanning method should be chosen. The selection of a proper scanning method should, however, be based on the value of the decoded DC coefficients of the current and neighboring blocks within the decoder. It should also be noted that the prediction direction decision (PDD) must acquire the DC value from previously decoded blocks F[n]. The prediction direction determined by executing PDD is utilized within the inverse DC prediction (IDCP) operation and the inverse AC prediction (IACP) operation. In these two procedures, the previously decoded data, F[n−1] is required in addition to QFA[n−1] which is also utilized.

The design of conventional decoders is constrained by the high-level of data dependency within the encoded bit-stream, which has resulted in the general adoption of a sequential decoding paradigm. This conventional sequential-decoding paradigm, however, is not readily extendable to multiprocessing decoder designs, in particular those which incorporate an arbitrary number of processing elements, such as three or more processors. Decoders have been previously considered which retain this sequential paradigm while employing a pair of processors according to a conventional operation slicing methodology. These slicing methods significantly hinder realizable performance gains, because of the high execution overheads involved in slicing a substantially sequential operation. In attempting to move beyond two processors, the execution overhead increases drastically which substantially limits the effective gains.

The current decoding methods which include prediction direction determination prior to the AC predictions also impact decoding performance, in particular the speed with which inverse AC predictions may be executed. Video bit-streams are often encoded with DC and AC coefficients which are determined in response to DC and AC predictions to provide a high efficiency encoding method. For example, DC and AC coefficients are utilized within INTRA macroblocks within an MPEG-4 video bit-stream. On the decoder side, however, the prediction direction must be determined prior to utilizing these DC and AC coefficients within an inverse prediction operation, as is shown in FIG. 1.

Figure 2:
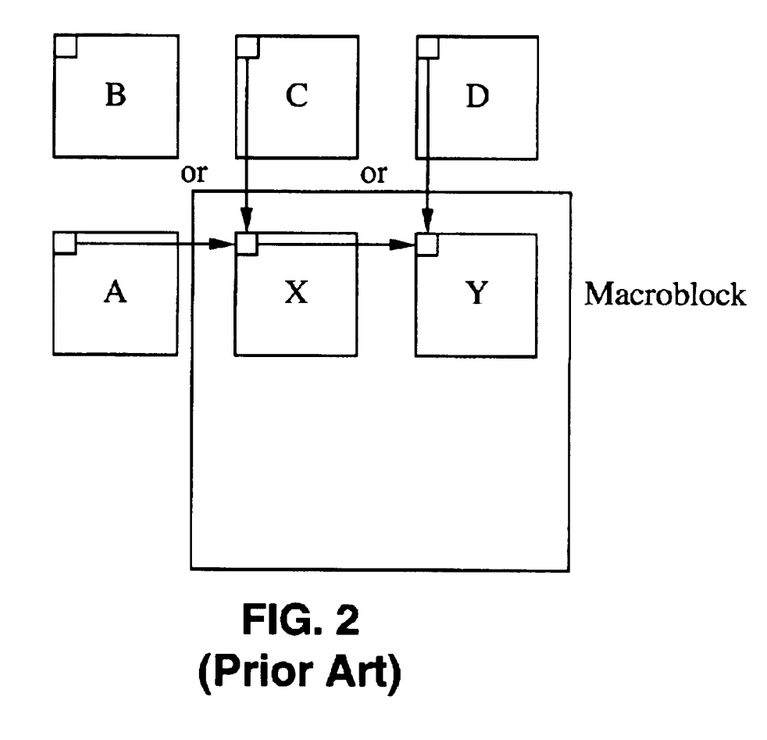
FIG. 2 is a data diagram in which a current block within a macroblock and a set of neighboring blocks are shown.

A prediction direction, for either DC or AC, is obtained based on a comparison of the horizontal and vertical DC gradients surrounding the block to be decoded. FIG. 2 illustrates a current block X surrounded to the left by a block A, above-left by block B, and above by block C. The inverse-quantized DC values of the previously decoded blocks, represented by F[0][0], are utilized to ascertain the direction of DC and AC prediction as follows:

if $(|F_A[0][0]-F_B[0][0]|<|F_B[0][0]-F_C[0][0]|)$ predict from block C
else
predict from block A The adaptive DC prediction method involves selection of either the F[0][0] value of the immediately prior block or that of the block immediately above from within the previous row of blocks, in response to the direction as determined above.

if (prediction is from block C)

$QF_X[0][0]=PQF_X[0][0]+F_C[0][0]//dc\_scalar$ else $QF_X[0][0]=PQF_X[0][0]+F_A[0][0]//dc\_scalar$ In the above relation, the value dc_scalar is obtained by quantization of the step-size, which is independently repeated for every block within the macroblock using the appropriate horizontally proximal block A and vertically proximal block C.

Figure 3:
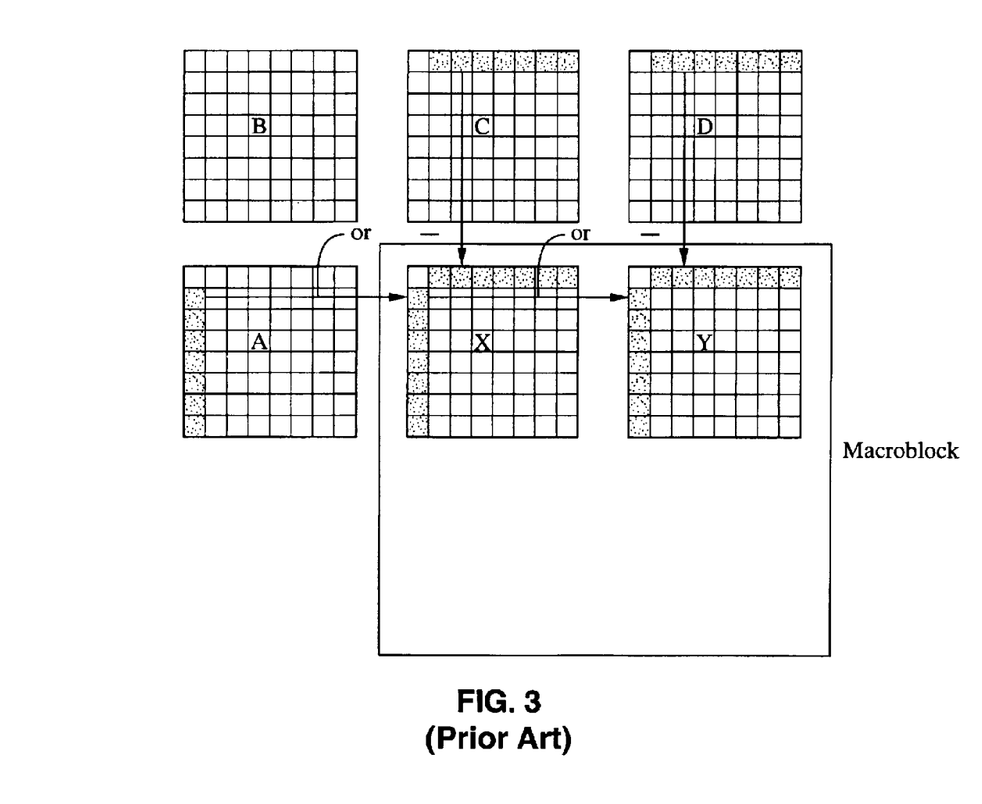
FIG. 3 is a data diagram showing the prediction of AC coefficients within each of the blocks in relation to the current block.

To predict the co-sited AC coefficient of the current block, shown by X, coefficients are utilized from either the first row, or the first column, from a previously coded block. When analyzed on a block basis, the optimum vertical or horizontal direction for DC coefficient prediction is also utilized to select the direction for AC coefficient prediction. It will be appreciated, for instance, that it becomes possible to predict each block independently of previous adjacent vertical and horizontal blocks within the given macroblock. FIG. 3 depicts neighboring blocks and coefficients utilized within an AC prediction.

Therefore, a need exists for a texture decoding method and AC prediction method that may be efficiently applied to multiprocessing decoder system environments. The present invention satisfies that needs, as well as others, and overcomes the deficiencies of previously developed texture decoding methods.

BRIEF SUMMARY OF THE INVENTION

A method of decoding texture information is described in which the decoding operations are distributed amongst a number of sub-processes. The method is particularly well-suited for use within multiprocessing decoders and is particularly well suited for configurations having at least three processing elements. In contrast to the conventional sequential decoding paradigm, the present method has recognized that texture decoding operations may be separated into two general classes: data dependent operations and data independent operations, based on whether the operation when applied to a given macroblock are dependent on the use of data from operations performed on other macroblocks. The present invention directs data dependent operations from a received video bit-stream for execution within a first sub-process, while the remaining data independent decoding operations are directed to additional sub-processes.

The method generally involves executing a set of data dependent operations on the video bit-stream within a first processor followed by the transfer of data independent structured macroblocks to additional processors which complete the decoding process. The additional processors execute the data independent macroblocks and provide an output to the video object plane (VOP). A transfer buffer is preferably utilized for communicating the data independent macroblocks from the first processor to the additional processors. Each of these additional processors can separately retrieve macroblocks, in accord with available processing bandwidth, from the transfer buffer as these macroblocks become available. Decoding is completed within each of the processors whose outputs are directed to the video object plane (VOP). Dividing the decoding operations across multiple processors according to the present invention can reduce the amount of overhead and make the overhead penalty substantially independent of the number of processing elements incorporated.

A further aspect of the present invention involves a method for performing rapid AC predictions based on utilizing a prediction direction assumption followed by subsequent decoding operations. A prediction direction is determined at a later time, and if it does not match the original assumed prediction direction, then a transpose operation is performed on the data. The method is particularly well-suited for use within multiprocessing environments.

Although the prediction direction may be predetermined, or randomly chosen, it is preferred that the assumed prediction direction be chosen based on considering which direction results in an overhead reduction when performing an inverse AC prediction. The simplification considerations may relate to architectural attributes of the circuitry executing the predictions, or similar attributes of the system. By way of example and not of limitation, the prediction direction is assumed to be in a given direction, such as being the direction from which the coefficients for the AC prediction may be loaded from sequential memory locations. Typically, a vertical prediction allows for retrieving the coefficients from sequential memory locations, wherein the number of instruction cycles within a processor may be reduced significantly.

The methods of the invention can lead to significant performance increases for multiprocessing decoders, wherein a first processor is utilized for performing sequential (data dependent) decoding operations while multiple additional processors may be efficiently utilized for processing block level data. The postponement of prediction direction determination (PDD) allows a number of the decoding operations to be deferred for processing by one of the multiple processors wherein overall decoding speed may be enhanced.

An object of the invention is to increase texture decoding speed within video decoders.

Another object of the invention is to reduce dependence between texture decoding speed and processor speed within the decoder.

Another object of the invention is to provide a texture decoding method which can be executed efficiently within a multiprocessing decoder.

Another object of the invention is to eliminate the necessity of instruction stream slicing within a multiprocessing decoder.

Another object of the invention is to eliminate the necessity of pre-scanning the video bit-stream prior to decoding.

Another object of the invention is to provide a multiprocessing decoder architecture wherein the choice of data transfer mechanisms is flexible.

Another object of the invention is to provide a texture decoding method which is applicable to a number of video formats including conventional formats, including MPEG-4, and H.263.

Another object of the invention is to provide enhanced multiprocessing decoder performance.

Another object of the invention is to provide a method for performing AC predictions that may be executed more readily within video decoders.

Another object of the invention is to provide a method of postponing the computation of prediction direction so that it may be executed by one of multiple processors within a multiprocessing decoder.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 4 through FIG. 12. It will be appreciated that the apparatus may vary as to configuration and as to details of the parts, and that the method may vary as to the specific steps and sequence, without departing from the basic concepts as disclosed herein.

A texture decoder and decoding method is described which may be efficiently implemented within a multiprocessing decoder that may comprise any arbitrary number of processing elements. In addition, an AC prediction method is described based on employing a prediction direction (PDD) assumption to reach an AC prediction more readily, wherein the data is later transformed if a PDD indicates that the assumption was invalid. By utilizing the present inventive method the decoding operations performed for any substantially object oriented video format, such as exemplified by the MPEG-4 or H.263 formats, may be partitioned into data dependent and data independent operations. In clarifying the distinction between data dependence and independence, it should be appreciated that a data dependent operation performed on a given macroblock requires collecting additional, temporally displaced, information from other macroblocks as a condition of executing the data dependent operation. As a result, data dependent operations are sequence dependent, and may not be properly executed when directed at individual macroblocks, such as could be processed within one of multiple non-synchronized processing elements. Data dependent operations thereby depend upon the acquisition of information from previous or future macroblocks. Recognition of this crucial distinction has led to an architecture within the present invention that provides a number of significant advantages for multiprocessor video decoding.

Figure 4:
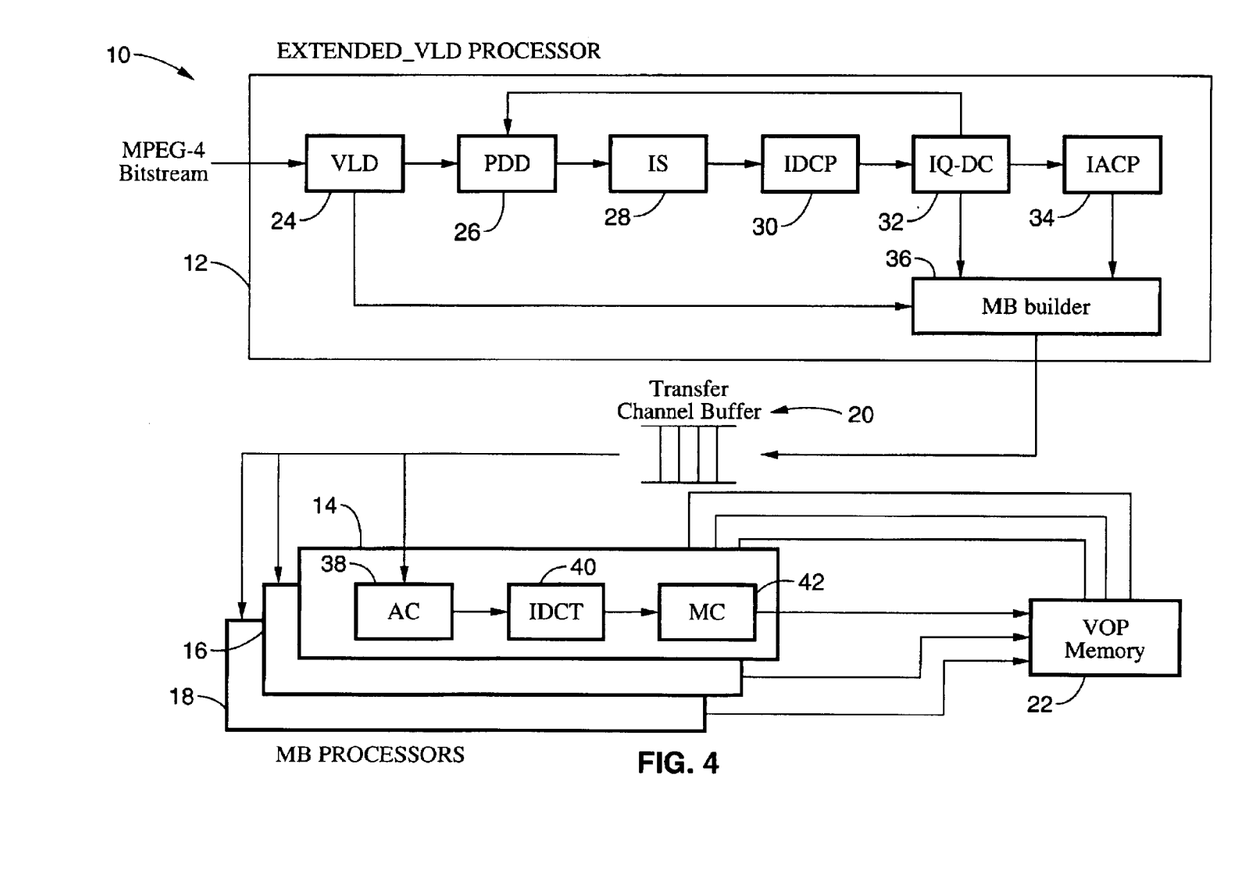
FIG. 4 is a block diagram of a decoder according to an embodiment of the present invention, shown with separate processing sections for data dependent and data independent operations.

FIG. 4 depicts a decoder 10 within which a first sub-process 12 is implemented within a processing element, and which communicates to additional sub-processes 14, 16, 18, through a transfer buffer 20, such as being executed on additional processing elements, whose output is directed to video object plane (VOP) 22. The exemplified embodiment considers each sub-process to be executed on a separate processing element, however, it will be appreciated that these sub-processes need not have a one-to-one correspondence with a processing element so long as the separation of data dependence and data independence according to the invention is maintained. The first sub-process 12, executing on a first processing element, is referred to herein as the VLD_EXTENDED process, and is created to execute all the data dependent operations which include VLD at block 24, PDD at block 26, IS at block 28, IDCP at block 30, and IACP at block 34, and a macroblock builder MB at block 36.

The DC value after inverse quantization, which is required from a previously decoded block by the IDCP, is supplied from within the sub-process VLD_EXTENDED 12. Each operation within the present invention is based on information at the block-level. However, the present invention includes a macroblock builder 36 which converts the decoded header and data information into a regular format of data structures so that it can be transferred uniformly to multiple processors which preferably execute data independent macroblocks. The data structure obtained within this process can be further processed without being dependent on information from other data structures. The sub-process VLD_EXTENDED is assigned to one of the processor elements, referred to herein as the first processing element which is referred to as a VLD_EXTENDED_processor. It should be appreciated that the VLD_EXTENDED process which is described as being executed on a VLD_EXTENDED_processor may alternatively be split across more than one processor element, such as execution being split according to a functional or slicing arrangement, without departing from the teachings of the present invention.

Each of the additional processing elements for executing data independent macroblocks within the decoder are referred to herein as an MB_processor, which in this case are exemplified as three processing elements 14, 16, 18, which are shown by way of example within the figure. In the embodiment of multiprocessing decoder 10, the sub-processes are directly associated with, and therefore synonymous with, each processing element which is configured to execute a single process.

Structured data is generated by the sub-process VLD_EXTENDED which is transferred to the MB_processors. As the independent macroblock data which is generated by the VLD_EXTENDED process has eliminated the data dependencies, these data blocks may be independently processed by any number of individual MB_processors. In addition, it will be appreciated that the data blocks generated by the VLD_EXTENDED process do not need to be processed in any specific order. Each of the MB_processors can thereby fetch structured data from the transfer buffer as it becomes available, such as after completing the processing of a prior macroblock. The macroblock processors retrieve available macroblocks when sufficient processing bandwidth becomes available within the MB_processor. It should be appreciated that the data independence of the data independent structured macroblocks alleviates the necessity of executing the independent macroblocks in a predetermined order by the other processing elements. The MB_processors execute the data independent operations to complete the decoding of the video bit-stream, such as MPEG-4, by executing a series of operations, such as a portion of the inverse quantization (IQ), (preferably the AC portion) 38, inverse discrete transform (IDCT) operations 40 which rely upon transform coefficients, and motion compensation (MC) 42 which depend upon stored video object plane (VOP) data, such as from VOP memory 22.

Figure 5:
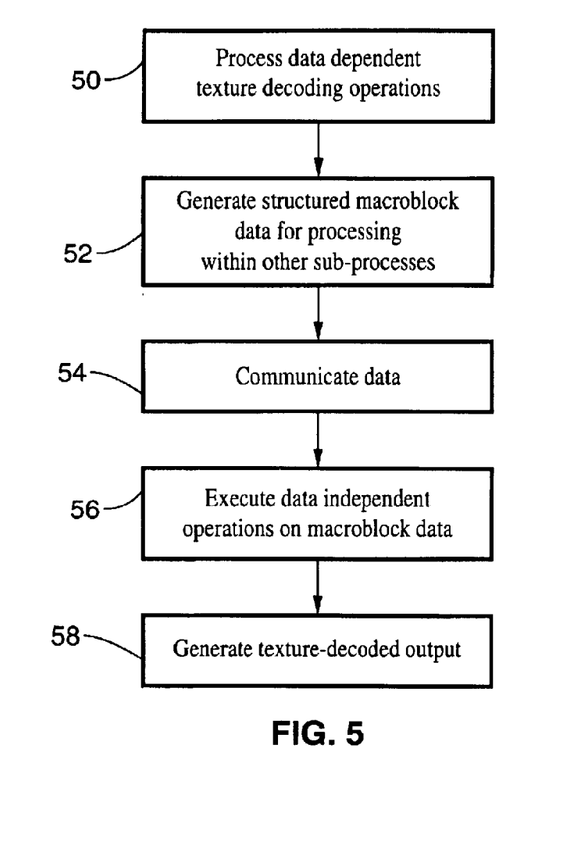
FIG. 5 is a flowchart of the texture decoding method according to an embodiment of the present invention, depicting the separation of decoding operations based on data dependency.

FIG. 5 depicts the flow of processing within the texture-decoding method of the present invention which divides decoding operations into data dependent operations and data independent operations which are separately applied to different sub-processes, such as may be implemented within the processing elements of a multiprocessing decoder. The data dependent texture decoding operations are performed as per block 50 within a single sub-process (VLD_EXTENDED) and structured macroblock data is generated at block 52 for processing within other sub-processes (MC), which are communicated at block 54 to the sub-processes. The data independent operations are executed on the macroblock data in relation to the video object plane (VOP), as shown in block 56, and a texture-decoded output is generated at block 58 in response to the execution of the macroblock data.

Figure 6:
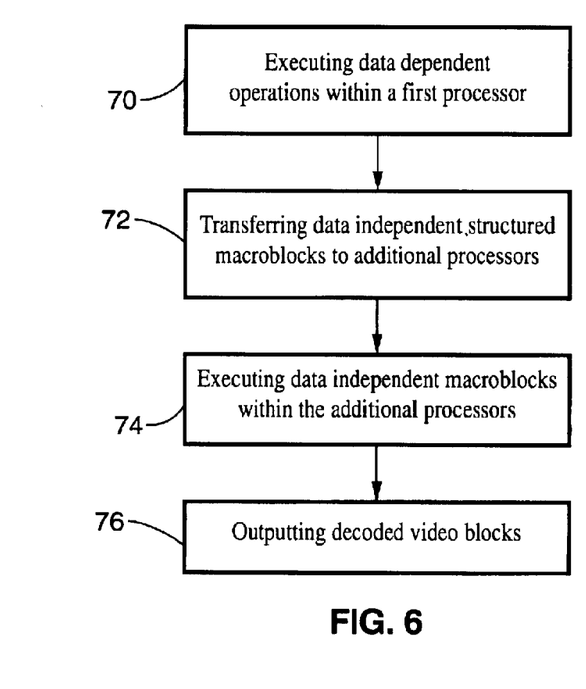
FIG. 6 is a flowchart of texture decoding according to an embodiment of the present invention which depicts texture decoding operations disbursed across multiple processing elements.

FIG. 6 depicts in more general terms the operations which comprise the present method executed on a decoder having multiple processing elements. A set of data dependent operations are executed within a first processor on a bit-stream encoded in a predetermined video format as per block 70. Transferring of data independent structured macroblocks to additional processors is as shown in block 72. Executing decoding operations on the data independent macroblocks within each of the additional processors is represented by block 74. Finally, the decoded video blocks are output from the additional processors, at block 76. Although as few as one additional processor may be utilized for processing the data independent macroblocks, it is preferred that at least three processing elements be available within the decoder of the present decoder to enhance decoder throughput.

The described multiprocessing decoders and methods of the present invention provide a number of advantages. First, as no "slicing" architecture is required to gain the speed benefits of multiprocessing, the described architecture is applicable to a variety of encoding standards, such as MPEG-4 and H.263. It will be appreciated that pre-scanning is not required within the present invention and that flexible data transfer mechanisms are supported. The transfer buffer may thereby be implemented utilizing high-speed data caches to improve performance, or may be assembled from low-cost external memory. Regardless of the memory architecture utilized, the required overhead for the data transfer is minimal. It will be appreciated that only a single copy of the VLD table is required for use by the VLD_EXTENDED_processor, while the other MB_processors have no need of information from within the VLD tables. It will be appreciated, therefore, that data cache requirements are significantly reduced and overall performance is increased as a result of utilizing the present inventive method.

The previously described multiprocessing decoder and method of performing texture decoding can be utilized to provide additional benefits. The following describes a method of performing inverse scanning first and subsequently determining AC predictions by altering the manner in which PDD is computed.

Figure 7:
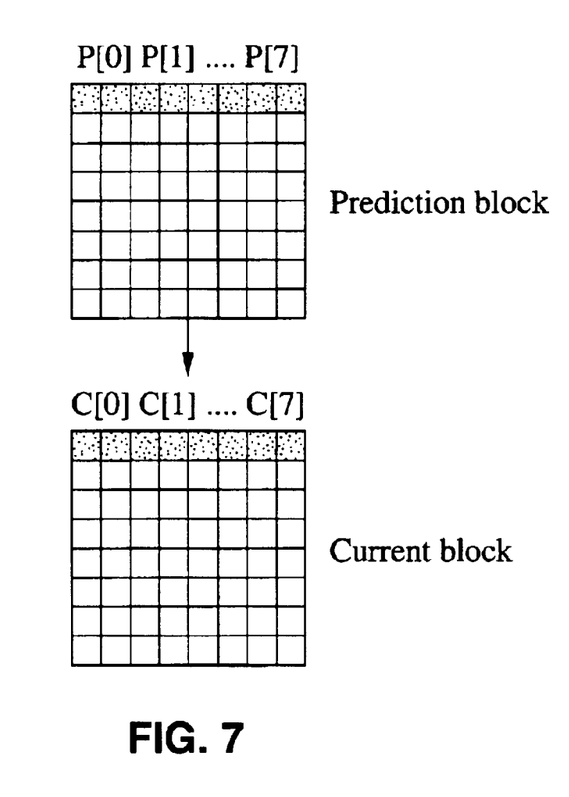
FIG. 7 is a data diagram of a data block within which a vertical prediction direction is shown in relation to the location of the coefficients within memory.

If the prediction direction is vertical, then the first row of the current block is predicted from the first row of the above block as depicted within FIG. 7. It will be appreciated, as previous described, that the vertical prediction can be performed as follows:

$$QF_x[i]=C[i]+P[i]//dc\_scalar \text{ for } i=0 \text{ to } 7$$

Figure 8:
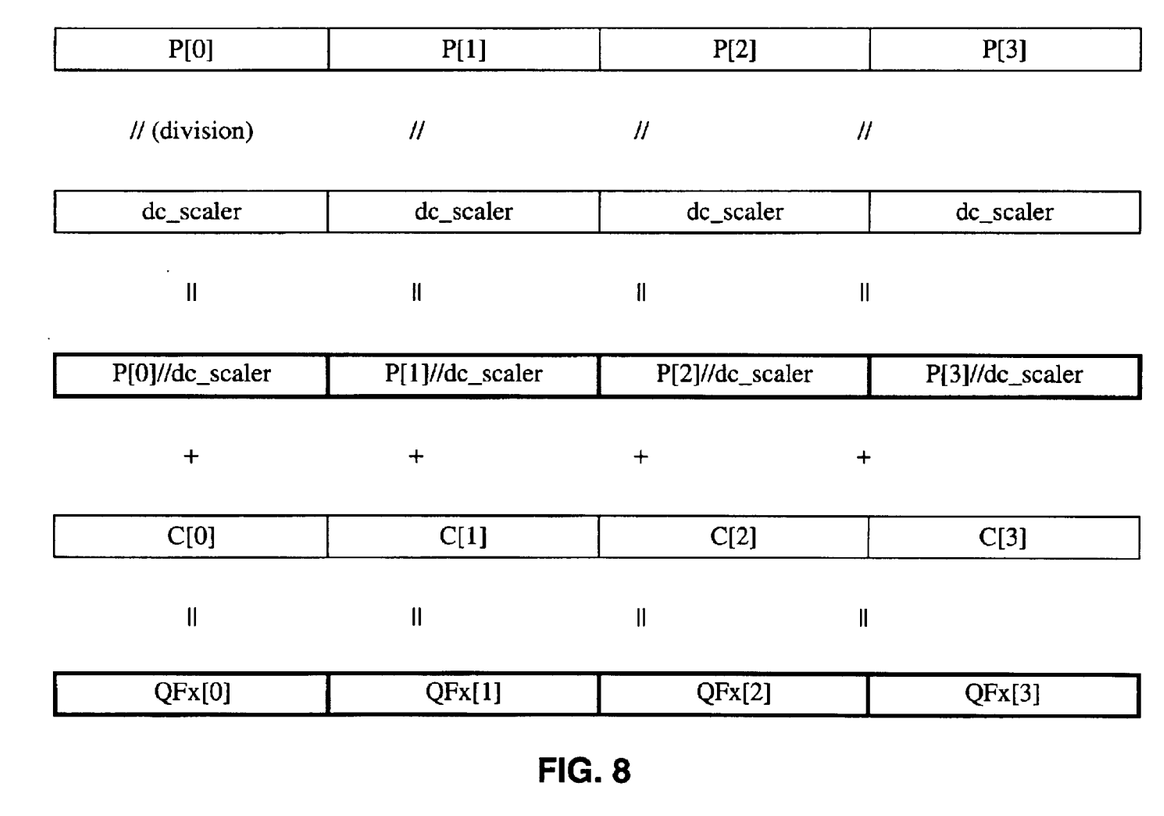
FIG. 8 is an instruction list which illustrates the use of an SIMD instruction according to one aspect of the present invention, shown utilizing two instructions for computing four coefficients.

FIG. 8 is an instruction list which illustrates an example of how the invention could be deployed on a multimedia processing element that incorporates single instruction multiple data (SIMD) instructions. It will be appreciated that a number of multimedia processors, in order to achieve high performance data processing, incorporate single-instruction multiple-data (SIMD) instructions. These SIMD processors can process multiple data elements in response to a single instruction. The use of SIMD instructions can enhance the performance of AC prediction within video formats, including MPEG-4 and those of similar architectures, when practicing the present inventive methods.

Note that the previously described AC prediction operation required seven divisions and seven additions for a total of fourteen instructions cycles. However, by utilizing SIMD instructions as illustrated by FIG. 8, the number of required instructions is significantly reduced. The use of SIMD instructions in the figure has resulted in only two instruction cycles being necessary for computing four coefficients, wherein only four instruction cycles are then necessary for performing an AC prediction. The foregoing example presumes the use of sixty four bit registers for SIMD instructions with sixteen bits being utilized for each coefficient. It should be appreciated that the invention provides a method of restructuring the computational sequence to allow it to be efficiently executed on multiprocessing environments and providing the ability to take advantage of processor specific speed enhancements, such as described above in relation with SIMD based processors. Those skilled in the art will appreciate that the present invention can be practiced on a variety of processor architectures and is not limited to SIMD or similar architectures.

Figure 9:
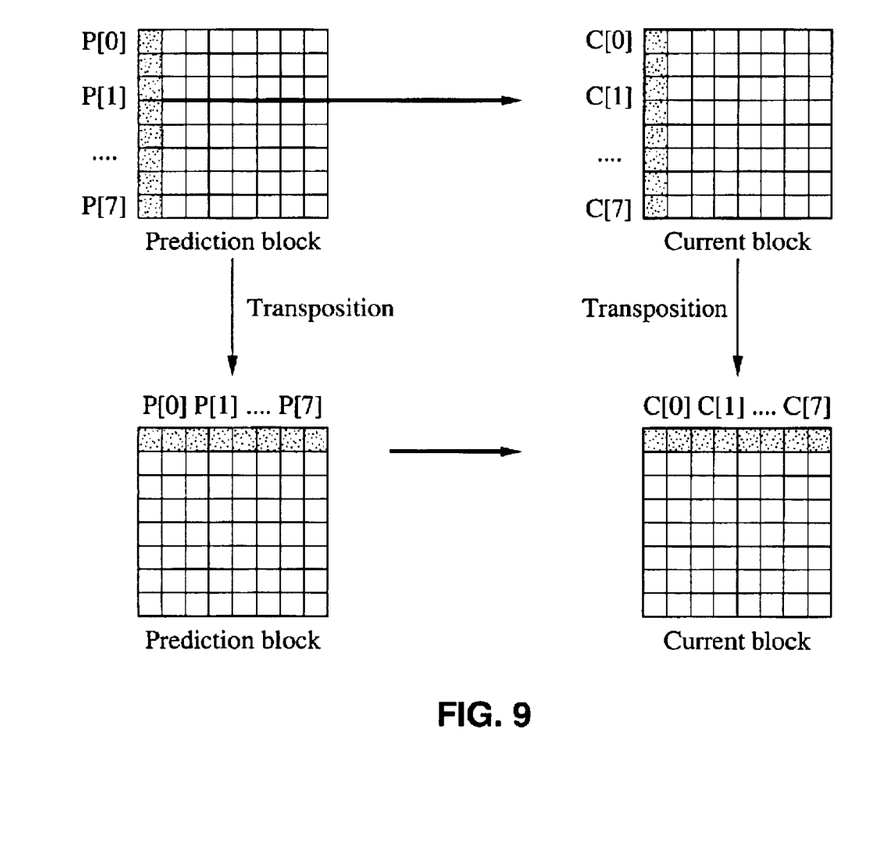
FIG. 9 is a data diagram of a data block within which a horizontal prediction direction is shown in relation to the locations of the coefficients within memory.

FIG. 9 depicts the use of transpositions. If the prediction direction is horizontal, the first column of the current block is predicted from the first column of the left block. Typically, the inverse scan is performed after deciding on the prediction direction. The present invention, however, postpones making the prediction direction determination (PDD), and instead makes an assumption about the prediction direction. The assumption is preferably made based on which direction will reduce the computational complexity, such as associated with the preferred sequential loading of coefficients. Scanning is then performed on the data according to the assumption, wherein alternate-horizontal scans would be applied for an assumed vertical prediction direction. It should be appreciated that the transpose of an alternate-horizontal scan becomes an alternate-vertical scan. Considering the example given in which the assumed prediction direction is vertical, if the actual prediction is horizontal then the transpose of the data is being processed instead of the actual data. The error, however, may be corrected at a later stage of processing by performing a transpose of the result. The ability to select a preferred direction based on lowering processor overhead, to be corrected later within one of multiple processing elements executing data independent operations, can increase multiprocessing efficiencies and allow for optimizing the order of operation so that coefficient loading penalties and other operational inefficiencies may be reduced or eliminated.

Figure 10:
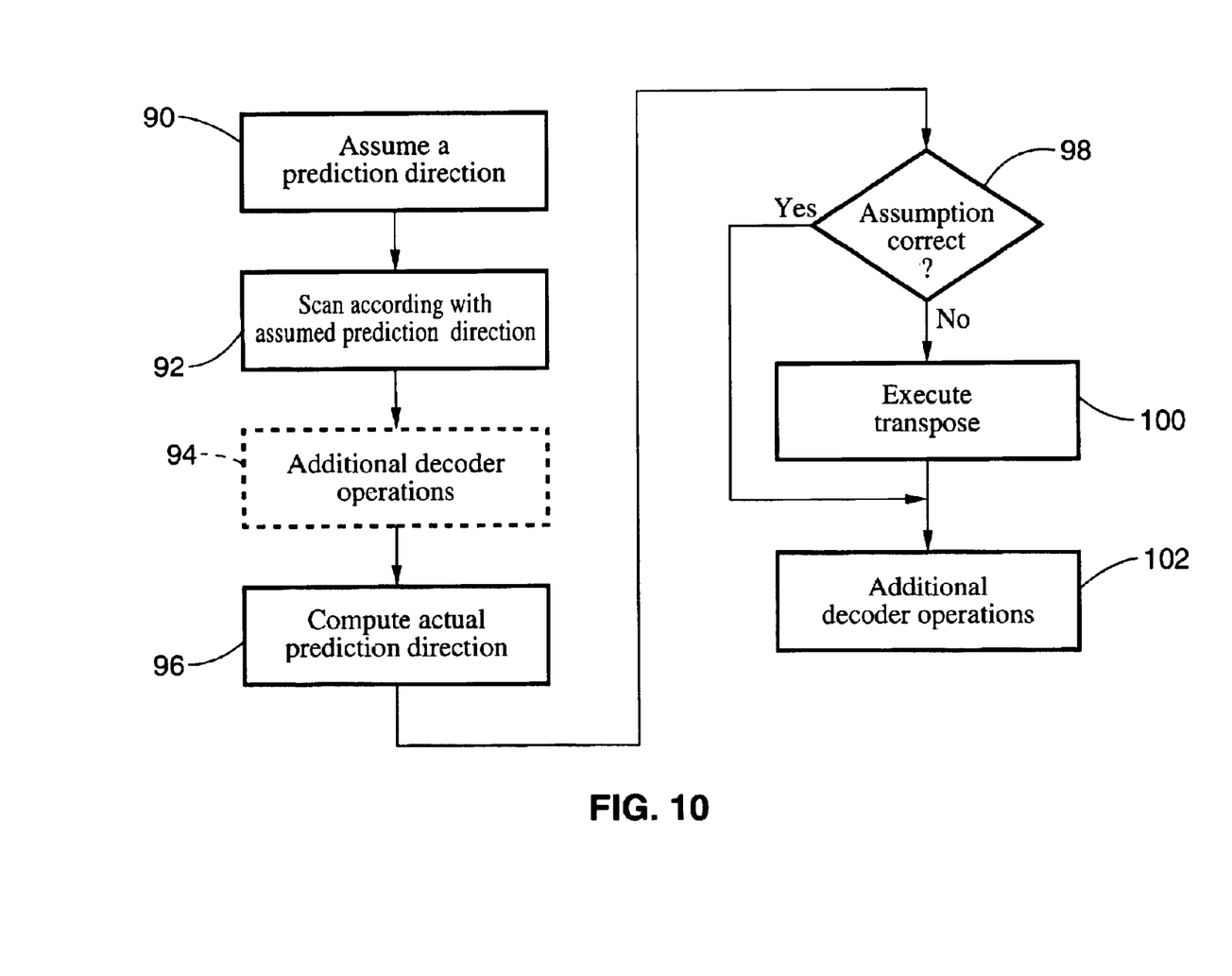
FIG. 10 is a flowchart of the prediction method according to an aspect of the present invention, wherein a PDD assumption is followed by a subsequent PDD computation and a transform as necessary to correct the decoded data.

FIG. 10 illustrates the general steps within the method of the present invention for providing faster decoding by reordering the decoding blocks. A prediction direction is assumed at block 90 for the data of the video bit-stream without first computing the prediction direction. Scanning is then performed according to the assumed prediction direction as per block 92. Optional decoder operations may also be performed based on the assumed prediction direction as shown in block 94. An actual prediction direction is computed at block 96. If the original assumption was correct, as determined at block 98, then a transform is not required, and decoder operations may continue. However, if the assumption was incorrect then a transpose is executed on the data as shown by block 100, after which additional decoding operations may be subsequently performed, as represented by block 102, which may include operations such as IQ, IDCT, MC, and so forth.

Figure 11:
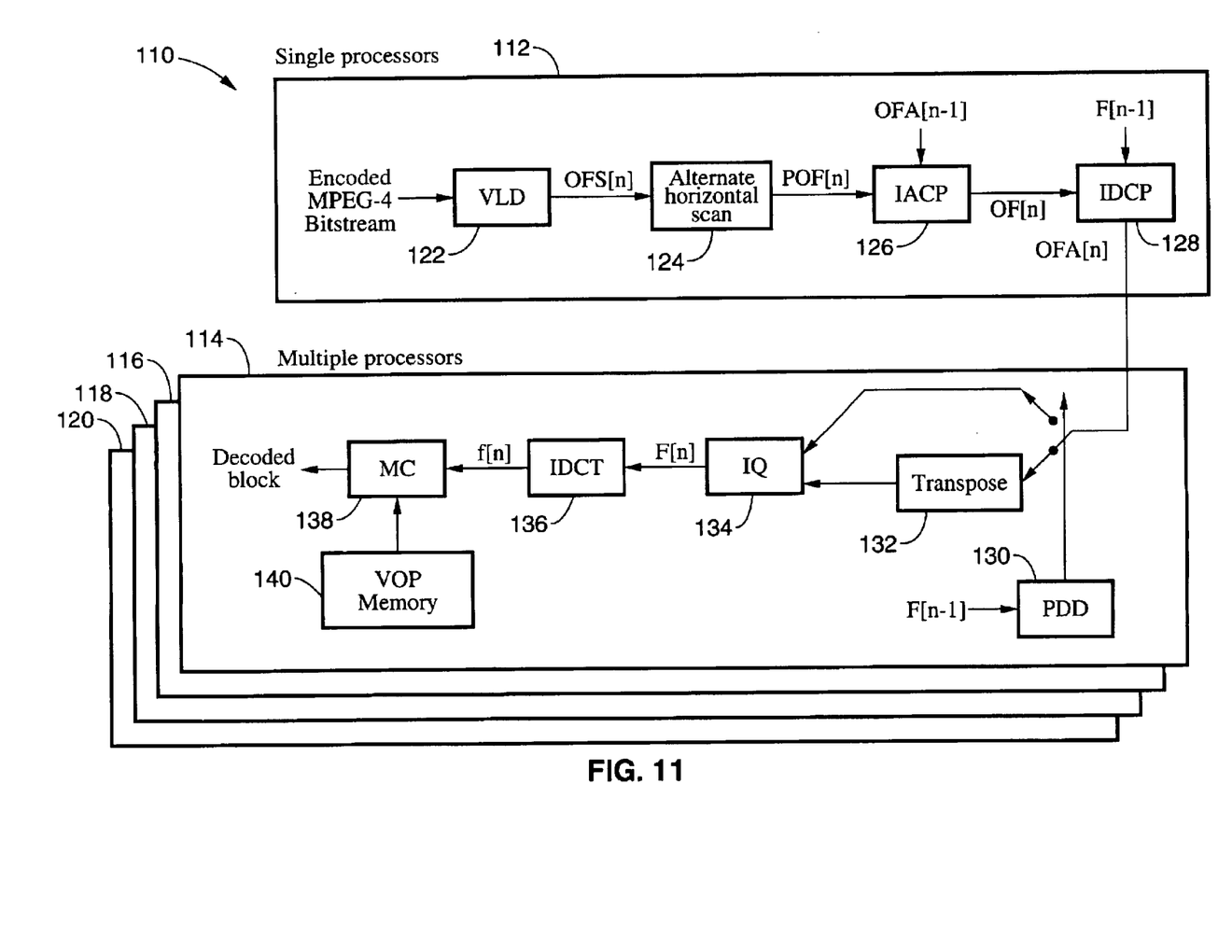
FIG. 11 is a block diagram of a decoder according to an aspect of the present invention, shown performing decoding and predictions in a sequential processor followed by block operations performed on multiple block level processors.

FIG. 11 exemplifies a decoder 110 of the present invention which performs the inverse scan first and then determines AC predictions later within a multiprocessing decoder in which a first processing element 112 is connected with multiple macroblock processing elements 114, 116, 118, and 120. The transfer buffer, or alternative transfer mechanism, for communicating the data independent macroblocks between the first processor element and remaining processor elements is not depicted, however, it will be appreciated that any conventional form of buffering may be utilized, such as conventional double-buffering.

The order of operations within the embodiment is illustrated with the encoded MPEG-4 video stream being received by the VLD operation at block 122, whose output is OFS[n] upon which an alternate horizontal scan is performed at block 124 to yield POF[n]. The output of block 124 is subject to an inverse AC prediction operation at block 126 which receives information from a preceding block OFA[n−1] and an inverse DC prediction operation at block 128 which is also subject to information from a prior block F[n−1]. The data dependent operations on the data have now been performed, and the data OFA[n] is passed to one of the macroblock processing elements, such as one of the four processor elements depicted 114, 116, 118, or 120. It will be appreciated that any number of macroblock processor elements may be utilized to suit processing within a given application. To provide efficient operation, at least two macroblock processing elements would be generally preferred.

The prediction direction decision is performed at block 130 within macroblock processing element 114 and a determination is made if the prior direction assumption was valid. If the direction decision was invalid, then a transpose is performed at block 132 on the data prior to inverse quantization (IQ) at block 134. The data F[n] is then subject to an inverse discrete transform (IDCT) at block 136 whose output f[n] is processed for motion compensation (MC) at block 138 in relation to a video object plane (VOP) memory at block 140.

The prediction direction decision (PDD) 130 can be seen within the figure as occurring after the AC prediction of block 126. The AC prediction thus may be performed according to an assumed direction. Following the prior example, if the actual prediction direction turns out to be vertical, then the result is transposed. The present decoding method is particularly beneficial when utilized within the depicted multiprocessor decoder architecture. One processor within the figure is shown configured for primarily executing sequential processes while the additional processors are configured to perform processing at the macroblock or block level. It will be appreciated that one of ordinary skill in the art may alternatively implement the processor for performing the sequential operations as a small number of processor elements which operate in similar manner to a single processor and share a single instruction stream, such as by conventional sliced operation.

Considering the example of processing an MPEG-4 video stream, the processor which is primarily executing sequential instructions proceeds to decode the variable length codes and executes processes whose results will effect subsequent decoding stages at the block level, and create data independent data structures for further processing. The resultant data independent data structures are transferred to other processors where additional decoding processes are performed, such as inverse quantization (IQ), inverse-discrete transform (IDCT) operations, and motion compensation (MC) operations. It will be appreciated that the present method is scalable as it does not constrain the number of processors which are utilized for processing the macroblocks. Given any number of macroblock processing elements, the overall decoding speed within a multiprocessing decoder system would thereby typically be constrained by the speed of the processor utilized for sequential processing, and reducing the workload of the sequential processor would be a paramount consideration.

Figure 12:
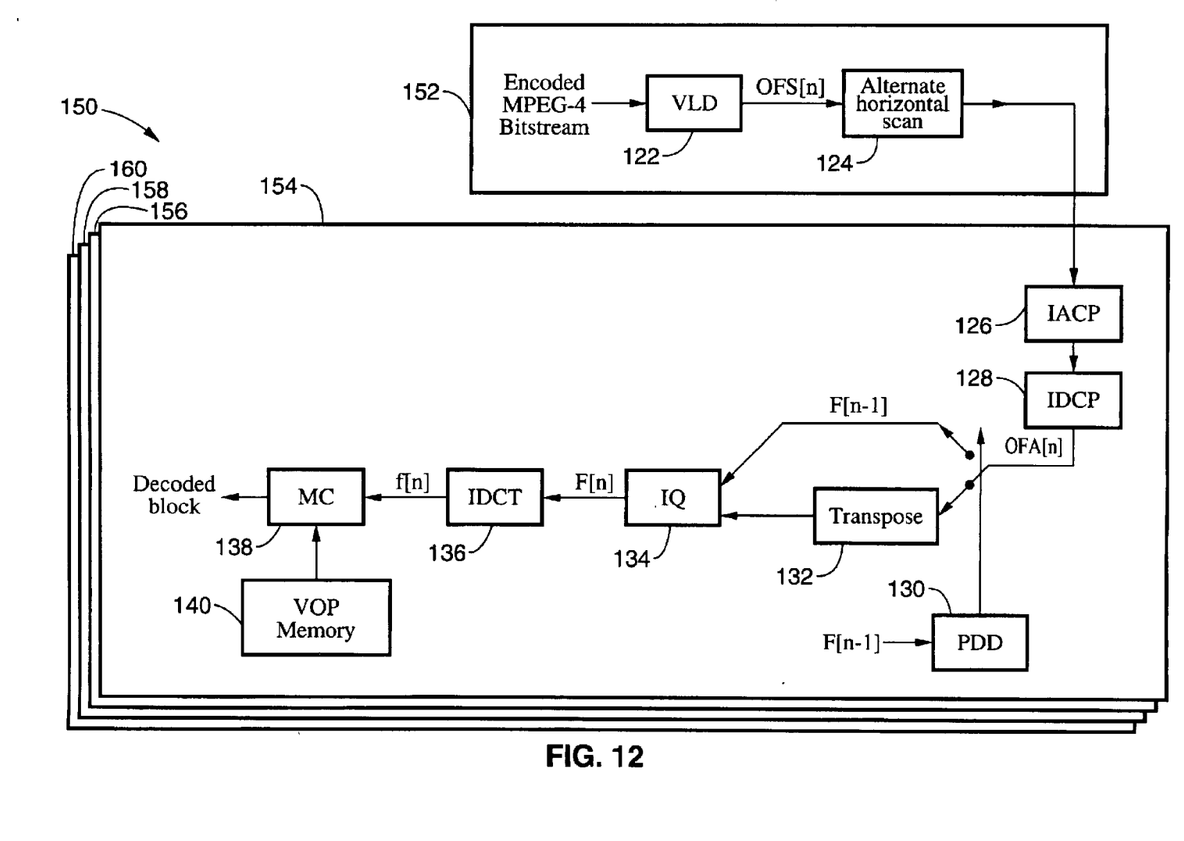
FIG. 12 is a block diagram of the prediction method according to an aspect of the present invention, shown with AC and DC predictions performed in the multiple independent macroblock processors within a multiprocessing decoder.

FIG. 12 depicts a decoder 150 having a first processor 152, or equivalent, which processes data dependent operations, exemplified as VLD 122, and scanning 124, and communicates data independent data structures, such as macroblocks, to a set of data independent processing elements, exemplified as four processing elements 154, 156, 158, and 160. The building of data independent macroblocks and macroblock transfer mechanism are not shown in the figure. The present decoder also employs the described method of postponing the prediction direction until a later stage. Decoder 150 is configured, however, to additionally postpone the execution of both inverse AC prediction 126 and inverse DC prediction 128, so as to allow shifting the computational burden from the sequential, data dependent, processing element 152, to the data independent multiple processing elements, such as 154, 156, 158, 160. As described previously, the computations required to provide DC and AC predictions involve numerous arithmetic operations which include lengthy division operations. The data independent operations are shown comprising inverse AC prediction (IACP) 126, inverse DC prediction 128, prediction direction decision (PDD) computation 130 which replaces the prior assumption, a data transpose 132 as necessary to correct for an incorrect assumption, inverse quantization 134, inverse discrete-transform (IDCT), and motion compensation (MC) 138 shown being performed in relation to the video object plane 140. The present inventive method allows the shifting of these lengthy computations to the data independent macroblock processors whose number may be increased as necessary to provide the desired level of performance.

Accordingly, it will be seen that this invention provides a method for performing real-time texture decoding within a multiprocessing decoder that can be implemented with numerous variations obvious to those skilled in the art. In particular, it will be appreciated that the described set of data dependent operations, which were described as including PDD, IS, IDCP, and IACP, may be varied, or further divided, by one of ordinary skill in the art without departing from the teachings of the present inventions. In addition, it will be seen that this invention describes a method for performing decoding operations that involve AC and DC predictions. The method is exemplified for use with an MPEG-4 bit-stream and a set of decoding operations, however, it will be appreciated that the teachings of the invention may be applied by one of ordinary skill in the art to other object-oriented video formats and that the ability to readily perform inverse AC predictions based on a beneficial assumption of prediction direction, which is corrected as necessary at a later stage, has wide applicability application.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for decoding video texture information, comprising:
   means for executing data dependent operations from within a video bit-stream and generating data structures upon which remaining data independent operations are to be executed;
   means for executing data independent operations within said decoder in relation to a video object plane; and
   a transfer buffer through which said data structures are communicated from said means for executing data dependent operations to said means for executing data independent operations;
   wherein executing the combination of data dependent and data independent operations provides decoding of video texture information.

2. An apparatus as recited in claim 1, wherein said means for executing data dependent operations comprises a processing element adapted for executing decoding operations.

3. An apparatus as recited in claim 2, wherein said means for executing data dependent operations executes one or more data dependent decoding operations as selected from the data decoding operations consisting of variable length decoding (VLD), prediction direction decision (PDD), inverse scanning (IS), inverse DC prediction (IDCP), inverse-quantization (IQ), inverse AC prediction (IACP), inverse DC prediction (IDCP), and macroblock building (MB).

4. An apparatus as recited in claim 3, wherein said macroblock building comprises converting decoded header and data information into a regular format of data structures configured for being transferred to multiple processors which execute data independent operations on said data.

5. An apparatus as recited in claim 1, wherein said means for executing data dependent operations is comprising a processing element adapted to perform variable length decoding (VLD), and arrives at a prediction direction decision (PDD) by computation or by making an assumption, and followed by inverse scanning.

6. An apparatus as recited in claim 1, wherein said means for executing data independent operations comprises a macroblock processing element adapted for executing decoding operations according to a data independent data structure.

7. An apparatus as recited in claim 6, wherein said macroblock processing element executes one or more data independent decoding operations as selected from the data operations consisting of prediction direction decision (PDD), data transposition, inverse AC prediction (IACP), inverse DC prediction (IDCP), inverse-quantization (IQ), and inverse discrete-transform (IDCT).

8. An apparatus as recited in claim 6, wherein said macroblock processing element is adapted to compute a prediction direction decision (PDD), correct prediction direction assumption errors with a data transpose operation, compute inverse quantization (IQ), and compute inverse discrete-transform (IDCT).

9. An apparatus as recited in claim 1, wherein said apparatus comprises at least two of said means for executing data independent operations for increasing decoder throughput.

10. An apparatus as recited in claim 9, wherein each of said means for executing data independent operations comprises a processing element configured for executing data independent operations; and
wherein said transfer buffer is configured for retaining a plurality of data independent macroblocks each of which may be processed by any said processing element which is not already engaged in processing a macroblock.

11. An apparatus as recited in claim 1, wherein said means for executing data independent operations is configured for being coupled to a means for performing motion compensation (MC) processing as a data independent operation in relation to a video object plane.

12. An apparatus for multiprocessor decoding of video texture information, comprising:
a first processing element adapted to execute macroblock decoding operations which must be performed in a sequential order;
wherein said first processor is adapted to build data structures for retaining data independent macroblock information;
a transfer buffer which is adapted to receive the data independent macroblock information; and
at least two macroblock processing elements operably connected to said transfer buffer which receive said data independent macroblock information, and execute additional decoding operations therein.

13. An apparatus as recited in claim 12, wherein said decoding operations of said macroblook processors are executed in relation to a video object plane.

14. An apparatus as recited in claim 12, wherein said data dependent decoding operations comprise operations which are performed on a given macroblock that require collecting additional, temporally displaced, information from other macroblocks as a condition of executing said data dependent operations, which accordingly must be processed in a sequential order.

15. An apparatus as recited in claim 12, wherein said adaptation for building data structures for retaining data independent macroblock information comprises a macroblook builder that converts the decoded header and data information into a regular format of data structures for transfer to multiple processors.

16. An apparatus as recited in claim 15, wherein said data structures do not require sequential processing within said multiple processors.

17. An apparatus as recited in claim 12, wherein all of said at least two macroblock processing elements are configured to similarly process said data independent macroblock information received through said transfer buffer.

18. A method of decoding texture information within a multiprocessing decoder, comprising:
executing data dependent decoding operations on a bitstream encoded in a predetermined video format within a first processor;
transferring data independent structured macroblocks, corresponding to remaining data independent operation, for execution by additional processors;
executing said remaining data independent macroblocks within each of the additional processors; and
outputting decoded video blocks from said additional processors.

19. A method as recited in claim 18, wherein said transferring comprises:
loading said data independent structured macroblocks into a transfer buffer; and
fetching of one of said data independent structured macroblocks by one of said additional processors when execution bandwidth is available.

20. A method as recited in claim 19, wherein the data independence of said data independent structured macroblocks by said additional processors alleviates the necessity of executing said independent macroblocks in a sequential order.

21. A method as recited in claim 18:
wherein said data dependent operations include making prediction direction decisions (PDD) as assumptions;
wherein said assumptions are corrected as necessary using transforms upon later execution of a prediction direction decision (PDD) which are included within said data independent operations.

22. A method as recited in claim 18, wherein said data dependent operations comprise inverse scanning (IS) within which a one-dimensional decoder array is converted into a two-dimensional array for further processing.

23. A method as recited in claim 18, wherein said data dependent operations comprise inverse DC prediction (IDCP) within which the prediction direction from the prediction direction decision (PDD) is utilized in making the DC prediction.

24. A method as recited in claim 18, wherein said data dependent operations comprise inverse AC prediction (IACP) within which the prediction direction from the prediction direction decision (PDD) is utilized in making the AC prediction.

25. A method as recited in claim 18, wherein said additional processors comprise at least two processing elements utilized for execution of said data independent macroblocks.

26. A method as recited in claim 18, wherein said data dependent operations comprise inverse scanning (IS) within which a one-dimensional decoder array is converted into a two-dimensional array for further processing.

27. A method as recited in claim 18, wherein said data dependent operations comprise inverse DC prediction (IDCP) within which the prediction direction from the prediction direction decision (PDD) is utilized in making the DC prediction.

28. A method as recited in claim 18, wherein said data dependent operations comprise prediction direction decisions (PDD) or a prediction direction assumption, inverse scanning (IS), inverse DC prediction (IDCP), and inverse AC prediction (IACP).

29. A method as recited in claim 18, wherein said data dependent operations comprise the DC inverse quantization (IQ-DC) which depend upon decoded DC values from previously decoded blocks.

30. A method as recited in claim 18, wherein said data independent operations comprise a portion of the inverse quantization (IQ) operations.

31. A method as recited in claim 30, wherein said portion of the inverse quantization (IQ) operation comprises AC inverse quantization (IQ-AC).

32. A method as recited in claim 18, wherein said data independent operations comprise inverse discrete transform (IDCT) operations wherein coefficients are utilized in the transform operation.

33. A method as recited in claim 18, wherein said data independent operations comprise motion compensation (MC) which depends on stored video object plane data.

34. A method as recited in claim 18, wherein said bit-stream is encoded in a substantially object oriented format.

35. A method as recited in claim 34, wherein said bit-stream is encoded in the MPEG-4 video format.

36. A method as recited in claim 34, wherein said bit-stream is encoded in the H.263 video format.

37. A method of decoding texture information within a decoder that can utilize a plurality of processing elements, comprising:
  processing data dependent texture decoding operations within a single sub-process;
  generating data independent structured macroblock data for processing within other sub-processes;
  communicating said structured macroblock data to said sub-processes;
  executing data independent operations on the macroblock data in relation to the video object plane; and
  generating a texture-decoded output in response to the execution of said macroblock data.

38. A method as recited in claim 37, wherein said data dependent texture decoding operations comprise an operation that when directed at a first macroblock requires that additional information be acquired from another macroblock to complete said operation.

39. A method as recited in claim 38, wherein said another macroblock comprises a macroblock that is temporally displaced from said first macroblack.

40. A method as recited in claim 37, wherein each of said sub-processes is executed on a separate processing element within said decoder.

41. A method as recited in claim 37, wherein said data dependent sub-process is executed within a single processing element.

42. A method as recited in claim 37, wherein said decoder upon which said method is implemented is configured with at least three processing elements.

43. A method as recited in claim 37, wherein said bit-stream is encoded in a substantially object oriented format.

44. A method recited in claim 43, wherein said bit-stream is encoded in the MPEG-4 video format.

45. A method as recited in claim 43, wherein said bit-stream is encoded in the H.283 video format.

\* \* \* \* \*